United States Patent [19]

Ball et al.

[11] Patent Number: 4,715,939

[45] Date of Patent: Dec. 29, 1987

[54] METHOD FOR REMOVAL OF MONOVALENT IONS FROM ZNSO$_4$ ELECTROLYTE BY ELECTRODIALYSIS

[75] Inventors: Donald L. Ball, Castlegar; Daniel A. D. Boateng, Montrose, both of Canada

[73] Assignee: Cominco Ltd., Vancouver, Canada

[21] Appl. No.: 41,026

[22] Filed: Apr. 21, 1987

[30] Foreign Application Priority Data

Apr. 22, 1986 [CA] Canada ................................. 507254

[51] Int. Cl.$^4$ ............................................ B01D 13/02
[52] U.S. Cl. .................................... 204/182.4; 204/115;
204/119; 204/130; 204/151; 75/115; 75/120;
423/106; 423/109; 423/544; 423/622
[58] Field of Search ............... 204/182.5, 182.4, 182.3,
204/301, 114, 115, 116, 117, 118, 119, 130, 151;
75/120, 115, 109; 423/106, 544, 622

[56] References Cited

U.S. PATENT DOCUMENTS

| | | | |
|---|---|---|---|
| 903,732 | 11/1908 | Laist ................................. | 423/493 |
| 1,403,065 | 1/1922 | Avery et al. ........................ | 204/119 |
| 1,901,592 | 3/1933 | O'Brien et al. ..................... | 423/103 |
| 3,673,067 | 6/1972 | Harwood et al. ................... | 204/182.4 |
| 3,926,759 | 12/1975 | Horn et al. ......................... | 204/182.4 |
| 3,958,986 | 5/1976 | Thorsen ............................. | 423/100 X |
| 4,005,174 | 1/1977 | Bodson ............................. | 423/103 X |
| 4,207,157 | 6/1980 | Hirai et al. ......................... | 204/151 X |
| 4,263,109 | 4/1981 | Swinkels et al. ................... | 204/119 |
| 4,325,792 | 4/1982 | Vaughan ...................... | 204/DIG. 13 |
| 4,636,295 | 1/1987 | Ball et al. .......................... | 204/182.4 |

FOREIGN PATENT DOCUMENTS 797733 10/1968 Canada .
892479 2/1972 Canada .
2136557 9/1972 Fed. Rep. of Germany .
1491851 11/1977 United Kingdom .

OTHER PUBLICATIONS

C.A.90, 159167q ('79) (JA Kokai 79 14323) Acid ZnSO4 from Galvanizing ... is Electro-Dialyzed at 500 A/m$^2$ for 10 h.

Primary Examiner—John F. Niebling
Assistant Examiner—John S. Starsiak
Attorney, Agent, or Firm—Arne I. Fors; Robert F. Delbridge

[57] ABSTRACT

Monovalent ions, especially chloride and fluoride, but also thallium, sodium and potassium are efficiently removed from ZnSO$_4$ electrolyte by electrodialysis. Monovalent anions are removed using alternating monovalent anion permselective membranes and cation exchange membranes. Monovalent anions and cations are removed using alternating monovalent anion and monovalent cation permselective membranes. Electrodialysis is carried out under turbulent conditions, at up to 60° C., a differential membrane pressure of less than 150 kPa, a current density of 10 to 500 A/m$^2$, and a pH of less than 5.5. Where both chloride and fluoride are removed a pH of 3.5 to 5.5 is maintained. Deposition of manganese and zinc on the electrodes is minimized by at least one of a number of means including arranging the membranes such that the end membranes are monovalent anion permselective; selecting a large electrode rinse flow; adding a small amount of soluble antimony and/or cobalt; and using a cathode made of a material that promotes hydrogen evolution over zinc deposition. The electrode compartments are preferably rinsed with a 0.1 to 1.0 M Na$_2$SO$_4$ solution at pH 0 to 4.

25 Claims, No Drawings

METHOD FOR REMOVAL OF MONOVALENT IONS FROM ZNSO₄ ELECTROLYTE BY ELECTRODIALYSIS

This invention relates to the removal of monovalent ions from $ZnSO_4$ electrolyte and, more particularly, to a method for the removal of halides and thallium from $ZnSO_4$ electrolyte by electrodialysis.

BACKGROUND OF THE INVENTION

In process for the recovery of zinc from zinc sulfate solution by electrolysis, it is necessary to subject electrolyte to purification in order to reduce the content of impurities that have deleterious effects in electrolysis. It is particularly important to obtain an adequate removal of monovalent ions, such as the chloride and fluoride anions and the monovalent thallium cation. The presence of chloride in zinc sulfate electrolyte causes the corrosion of lead anodes, and at high concentrations the evolution of chlorine gas could occur which would be harmful in the work environment. Fluoride is the main cause of zinc deposits sticking to the cathodes, and thallium co-deposits with zinc and also tends to raise the amount of lead deposited with zinc. Although trivalent thallium is usually removed during iron precipitation, the monovalent form remains in the purified electrolyte. The $ZnSO_4$ purification process and the effects of various impurities are discussed in Mathewson C.H., Zinc—The Metal, Its Alloys and Compounds, 3rd Print, Reinhold Publishing Corporation, 1964, pp. 65-333.

The prior art contains a number of references on the removal of halides from $ZnSO_4$ electrolyte. Chloride has been conventionally removed as CuCl (U.S. Pat. Nos. 903,732, 1,104 907, 1,901,925 and 4,005,174, and G.B. Pat Nos. 18,080 (1890) and 1, 491,851), or as AgCl (U.S. Pat Nos. 1,403,065 and 4,263,109), or by solvent extraction (U.S. Pat. Nos. 3,393,046 and 3,958,986, and DE Pat. No. 2,136,557). Chloride and fluoride have been removed by preleaching (U.S. Pat. No. 3,494,841) or by washing calcined concentrate, flue dust, residue, ashes and dross with sodium carbonate solution (G.B. Pat. No. 1 139 460). These methods for halide removal have a number of disadvantages, the main one being that the removal is usually incomplete and that methods for removal of chloride and fluoride are usually complemented by further removal of chloride as CuCl or AgCl. The removal of fluoride by washing solids with soda solution is expensive and will still result in fluoride ions being present in the purified $ZnSO_4$ electrolyte. It is generally recognized in the industry that no methods exist that can effectively and cheaply remove fluoride ions from $ZnSO_4$ electrolyte.

The removal of ions from solutions could be carried out by methods that may include electrodialysis. Removal of anions and cations from solutions by electrodialysis is well documented (e.g., see U.S. Pat. Nos. 3,673,067; 3,926,759, 4,207,157 and 4,325,792; JA Kokai No. 79 14323 (Chem. Abstracts 90, 159167q, 1979); SU Pat. No. 1 042 770 (Chem. Ab. 99, 197263m, 1983); and Chem. Ab. 88, 158970t, 1978). These references, however, do not disclose the use of electrodialysis in the removal of thallium from solutions, or the use of electrodialysis in the purification of $ZnSO_4$ electrolyte for the electrowinning of zinc, or the removal of chloride, fluoride and thallium from $ZnSO_4$ electrolyte by electrodialysis.

SUMMARY OF THE INVENTION

We have now found that the halides as well as monovalent cations can be efficiently removed from $ZnSO_4$ electrolyte by electrodialysis.

$ZnSO_4$ electrolyte, containing monovalent ions including chloride, fluoride, thallium, sodium and potassium ions, is passed through an electrodialysis unit to remove monovalent anions, especially chloride and fluoride, and to remove monovalent cations, especially thallium. The electrodialysis unit includes a number of alternating concentrate and diluate (depleted solution) compartments separated by alternating cationic and anionic membranes, and an anode and a cathode compartment containing an anode and a cathode, respectively. The anionic and cationic membranes are selected from suitable monovalent ion permselective membranes, or, when selective removal of monovalent cations such as thallium is not required, the cationic membranes can be selected from the generally available cationic membranes. Zinc and manganese deposition on the electrodes is controlled by one or more of a number of means that include the controlling of the compositions and flow rate on an electrode rinse solution that is circulated through the anode and the cathode compartments; the arranging of the alternating membranes such that the anode compartment and cathode compartment are separated from the adjacent diluate compartments by a monovalent anion permselective membrane; the addition of a small amount of cobalt and/or antimony; and the use of a cathode material that favours hydrogen evolution over metal deposition. Because fluoride removal is pH dependent, the pH of the electrolyte is carefully controlled within a predetermined range. The strict control of pH is not necessary if the anion removal is restricted to chloride. The electrodialysis may be carried out in one or more stages depending on the concentration of monovalent ions in the $ZnSO_4$ electrolyte to be purified and/or the desired level of these ions in the purified electrolyte. By choosing appropriate conditions, the method of the invention can result in the effective removal in one or more stages of 90% or better of the monovalent ions, especially chloride, flouride and thallium from the $ZnSO_4$ electrolyte.

It is a principal object of the present invention to provide a method for the purification of $ZnSO_4$ solutions. It is another object to provide an efficient method for the removal of chloride and fluoride ions from $ZnSO_4$ electrolyte by electrodialysis. It is a further object to provide an efficient method for the removal of monovalent thallium ions from $ZnSO_4$ electrolyte by electrodialysis. It is yet another object to provide means whereby metal deposition on the electrodes during electrodialysis is minimized. Other objects of the present invention will become clear from the following detailed description of the embodiments of the method according to the invention.

According to the main embodiment of the invention, there is provided a method for the purification of zinc sulfate electrolyte containing concentrations of monovalent cations including at least one cation chosen from the group consisting of thallium, sodium and potassium, and monovalent anions including at least one anion chosen from the group consisting of chloride and fluoride by electrodialysis, which method comprises the steps of feeding zinc sulfate electrolyte to diluate cells of an electrodialysis unit comprising a multiplicity of alternating monovalent cation permselective exchange membranes and monovalent anion permselective exchange membranes, said membranes defining alternating diluate and concentrate cells, an anode compartment and a cathode compartment, an anode positioned in the anode compartment and a cathode positioned in the cathode compartment; rinsing said anode compartment and said cathode compartment with circulating rinse solutions; applying an electrical current between the anode and the cathode at a value such that the value of the corresponding current density is in the range of about 10 to 500 A/m$^2$; maintaining the temperature in the unit in the range of about 0° to 60° C.; feeding electrolyte at a pH having a value of less than about 5.5; passing flows of solutions through the diluate and concentrate cells at a linear velocity sufficient to maintain turbulent flow in said cells; withdrawing a diluate from said diluate cells; and recovering purified zinc sulfate electrolyte with reduced concentrations of monovalent cations and monovalent anions.

According to a preferred embodiment, there is provided a method for the purification of zinc sulfate electrolyte containing concentrations of monovalent cations including at least one cation chosen from the group consisting of thallium, sodium and potassium and monovalent anions including at least one anion chosen from the group consisting of chloride and fluoride by electrodialysis, which method comprises the steps of feeding zinc sulfate electrolyte at rates in the range of about 2 to 40 L/h.m$^2$ per membrane pair to diluate cells of an electrodialysis unit comprising a multiplicity of alternating monovalent cation permselective exchange membranes and monovalent anion permselective exchange membranes, said membranes having a membrane matrix of a styrene di-vinyl benzene copolymer and having active groups in an amount in the range of about 3 to 4 milli-equivalents per gram of dry resin, the active groups of the monovalent cation permselective exchange membranes being sulfonic acid radicals and the active groups of the monovalent anion permselective exchange membranes being a derivative of trimethylamine, said membranes defining alternating diluate and concentrate cells, an anode compartment and a cathode compartment, said membranes being arranged in the electrodialysis unit such that monovalent anionic permselective exchange membranes form the end membranes next to the electrode compartments, an anode positioned in the anode compartment and a cathode made of platinum coated titanium positioned in the cathode compartment; rinsing said anode compartment and said cathode compartment with a circulating rinse solution having a pH in the range of about 2 to 3 and containing sodium sulfate in a concentration in the range of about 0.1 to 1.0M, a soluble form of antimony in an amount in the range of about 2 to 10 mg Sb/L of rinse solution and a soluble form of cobalt in an amount in the range of about 2 to 5 mg Co/L of rinse solution; maintaining a concentration of zinc in said rinse solution of less than about 150 mg/L; applying an electrical current between the anode and the cathode at a value such that the value of the corresponding current density are in the range of about 50 to 300 A/m$^2$; maintaining the temperature in the unit in the range of about 20° to 50° C.; feeding electrolyte at a pH having a value in the range of about 2 to 5.5; passing flows of solutions through the diluate and concentrate cells at a linear velocity sufficient to maintain turbulent flow in said cells; passing flows of solutions through the diluate and concentrate cells and said rinse solution circulating through said anode compartment and said cathode compartment at flow rates such that the differential pressure across the membranes is less than about 50 kPa; withdrawing a diluate from said diluate cells; and recovering purified zinc sulfate electrolyte with reduced concentrations of monovalent cations and monovalent anions.

DESCRIPTION OF THE PREFERRED EMBODIMENTS

ZNSO$_4$ electrolyte is made by leaching concentrates, calcine and other zinc-containing materials with sulfuric acid. The resulting ZnSO$_4$ electrolyte is subjected to purification to remove undesirable ions and to make the electrolyte suitable for the electrowinning of zinc at high current efficiency and of high purity. The purification includes the so-called iron purification and the purification with zinc dust. The method according to the invention can be used prior to or after zinc dust purification, but is preferably used after the purification with zinc dust. ZnSO$_4$ electrolyte may contain monovalent ions such as chloride, fluoride, thallium, sodium and potassium, and multivalent ions such as zinc, sulfate, manganese, cobalt, nickel, copper, cadmium, antimony, arsenic, iron, magnesium and calcium. The method according to the invention is particularly useful for the removal of monovalent ions including at least one monovalent anion selected from the group consisting of chloride and fluoride and for the removal of monovalent cations including thallium.

ZnSO$_4$ electrolyte, obtained from the iron-purification or after zinc dust purification, is fed to an electrodialysis unit. The electrodialysis unit comprises a multiplicity of vertically arranged, alternating monovalent anion permselective exchange membranes and cation exchange membranes or monovalent cation permselective exchange membranes, a cathode compartment and an anode compartment. The choice of membranes is very important. When only monovalent anions are to be removed, a combination of monovalent anion permselective membranes and general cation exchange membranes (limited permselectivity for mono over multivalent cations) makes it possible to remove monovalent anions from the electrolyte. This combination of membranes can be advantageously used when monovalent cations are present in an amount less than the equivalent amount of monovalent anions. In that case the transfer of zinc ions must be increased in an amount equivalent to that of the monovalent anions. When both monovalent anions and monovalent cations are to be removed, or when approximate equivalent amounts of monovalent cations and anions are present in the feed, a combination of monovalent anion and monovalent cation permselective membranes is used. Such combination will, therefore, make it possible to separate monovalent from multivalent ions, and to concentrate the monovalent cations, particularly monovalent thallium, and to concentrate the monovalent anions such as chloride and fluoride. The ZnSO$_4$ electrolyte thereby becomes depleted from these ions, i.e., the ZnSO$_4$ electrolyte is purified. Suitable monovalent cation permselective membranes must have a high permselectivity for monovalent cations, particularly thallium, a low permselectivity for multivalent cations, especially zinc, a high resistance against chemical deterioration, biological fouling and thermal degradation, a low electrical resistance and a high mechanical strength.

We have found that suitable monovalent cationic permselective membranes are, for example, strongly acidic membranes which have a membrane matrix of a styrene di-vinyl benzene co-polymer on a polyvinyl chloride base and possess sulfonic acid radicals (R—SO$_3$H) as active groups. The active groups comprise 3-4 milli-equivalents per gram of dry resin which is satisfactory to provide the desired selectivity for monovalent ions. In particular, we have found that suitable monovalent cationic permselective membranes are treated Selemion TM CMR, Selemion TM Experimental A (specially treated on one face) and Selemion TM Experimental B or Selemion TM CSR (both surfaces specially treated). If the object is to remove only monovalent anions such as chloride and fluoride ions, and not thallium and other monovalent cations, the choice of the cationic membrane can be extended to include others available on the market such as, for example, those with sulfonic acid radicals (R —SO$_3$H) as the active groups at 3-5 milli-eqivalents per gram of dry resin, e.g., Selemion TM CMV.

Suitable monovalent anion permselective membranes must have properties similar to those for the cationic membranes. Suitable monovalent anion permselective membranes are, for example, strongly basic membranes with quaternary ammonium active groups, such as, for example, derived from trimethylamine (for example, R—N(CH$_2$)$_3$.Cl), at 3-4 milliequivalents per gram of dry resin, and having a matrix of a styrene di-vinyl benzene co-polymer on a polyvinyl chloride base. Selemion TM ASV or ASR, which is permselective for monovalent anions, particularly chloride and fluoride ions, is particularly suitable.

The Selemion TM membranes, which are manufactured by the Asahi Glass Company of Tokyo, Japan, have the desired properties. It is understood that membranes with similar properties produced by other manufacturers such as Neosepta TM CM-1, Neosepta TM CMS, Neosepta TM ACS, and Neosepta TM CLE-E membranes that are produced by the Tokuyama Soda Co. Ltd. of Japan, and Ionac TM MC-3470, produced by the Ionac Chemical Company, are similarly suitable and that the use of combinations of other membranes may yield the desired results.

The alternating cationic and anionic membranes form a number of alternating dilute cells and concentrate cells which is situated between the anode compartment and the cathode compartment. The anode and cathode are made of suitable materials. For example, the anode can be made of platinum coated titanium and the cathode of stainless steel. The cathode can also be advantageously made of a material for which the hydrogen overvoltage is lowered, such as platinum coated titanium, in order to favour hydrogen evolution over the deposition of zinc. A source of direct current is connected to the electrodes.

The ZnSO$_4$ electrolyte is fed to the diluate cells. If suspended solids are present in the electrolyte, they must be removed in a solid-liquid separation step, such as filtration, to reduce the suspended solids to less than 5 ppm and preferably to less than 1 ppm. A depleted solution or diluate, i.e, a purified ZnSO$_4$ electrolyte, is withdrawn from the diluate cells. A concentrate, i.e. a solution concentrated in monovalent ions, particularly chloride, fluoride and thallium ions, is withdrawn from the concentrate cells, preferably at a rate equal to the rate of the net water transfer from the diluate to the concentrate during the electrodialysis. It is important to maintain turbulent conditions in the concentrate and diluate cells. This can be achieved by passing solution through the cells at a sufficient rate. If desired, at least a portion of the diluate and at least a portion of the withdrawn concentrate may be circulated as feed to the diluate and concentrate cells respectively, mainly to ensure turbulent conditions, but also to achieve the desired removal and concentration of ions.

During electrodialysis, water transport occurs by osmosis and electro-osmosis usually in opposing directions and at different rates. The net water transport generally occurs in the direction from the diluate to the concentrate cells. This water transport is sufficient, in most cases, to form concentrate stream flows adequate for withdrawal. In those cases wherein the net water transfer rate to the concentrate cells is less than the desired withdrawal rate of concentrate from the concentrate cells, it will be necessary to feed a receiving solution to the concentrate cells. For example the receiving solution may be chosen from water, dilute sulfuric acid and a dilute salt solution compatible with the general operation of the electrodialysis unit, such as, for example, a dilute sodium sulfate solution.

In the cathode and anode compartments the predominant reactions are hydrogen and oxygen evolution, respectively. However, small amounts of manganese dioxide and zinc deposit on the anode and cathode, respectively. The deposition on the electrodes is undesirable and should be kept at a minimum. The deposition can be controlled and kept at a minimum by a number of means. The first is to arrange the membranes in the electrodialysis unit such that anionic membranes form the end membranes, i.e. are the membranes next to the electrode compartments. The deposition at the electrodes can also be controlled by selecting a large enough electrode rinse flow to minimize the concentration of manganese and zinc. Thirdly, the amount of the deposits, especially of zinc, can also be controlled by adding small amounts of a soluble form of at least one element chosen from the group consisting of antimony and cobalt, the use of both being particularly advantageous. Additions of up to 100 mg Sb/L of rinse solution and/or up to 100 mg Co/L of rinse solution may be used. The preferred amounts are in the range of about 2 to 10 mg Sb/L and about 2 to 5 mg Co/L, at which levels of addition only a small amount zinc is deposited. Lastly, the depositions, especially of zinc, can be controlled by using a cathode made of a suitable material to promote the evolution of hydrogen over zinc deposition. For example, a cathode material of platinum coated titanium may be advantageously employed. Any one of the above described means may be used alone or in combination with one or more of the other means to control the deposition at the electrodes.

The cathode and the anode compartments are rinsed with circulating rinse solutions. For the sake of simplicity, solution is a common rinse solution circulated to both the electrode compartments. The rinse solution may be chosen from water, dilute sulfuric acid and sodium sulfate maintained at a pH in the range of about 0 to 4. The solution is preferably an acidified solution of sodium sulfate. A suitable rinse solution contains sodium sulfate in a concentration in the range of about 0.1 to 1.0M with or without added cobalt and antimony and is maintained at a pH at values in the range of about 2 to 3, values in the higher end of the range being preferred for more efficient fluoride removal. The rinse solution is circulated at a rate sufficient to give a differential pressure across the membranes of less than 150° kPa, preferably less than 50° kPa. A portion of the rinse solution may be removed from circulation and be replaced with a substantially equal portion of fresh solution so that the zinc concentration in the rinse solution is maintained at about 150 mg/L or less.

During electrodialysis, the monovalent cations and anions in the feed solution pass from the diluate cells to the concentrate cells through the monovalent permselective cationic and anionic membranes respectively, leaving substantially all multivalent cations and anions in the diluate cells. The gases evolved at the electrodes are carried from the cathode and anode compartments in the rinse solution.

The electrodialysis unit may be operated with solution temperatures in the range of from just above the freezing temperature of the solution to as high as 60° C., i.e. from about 0° to 60° C. At the higher temperatures, the process is more efficient but the life of the membranes is reduced.

The process is preferably operated with solution temperatures in the range of about 20° to 50° C.

The method is conducted with an electrolyte feed solution having a value of the apparent pH that must be less than about 5.5. At values above about 5.5, precipitation of zinc as hydroxide or basic zinc sulphate can occur. At values of the pH below about 2, bisulfate ions are formed and transferred. Consequently, the pH of the electrolyte feed is in the range of about 2 to 5.5. We have also found that the removal of fluorine is sensitive to the pH due to the formation of hydrogen fluoride at pH below about 3.5. The pH of the diluate and concentrate streams is, therefore, preferably at a value of not less than about 2 and most preferably at a value in the range of about 3.5 to 5.5. When only chloride removal is desired, the pH can be at values in the range of about 2 to 5.5.

The flow rate of solutions through the concentrate and diluate cells should be such that the linear velocity is sufficient to obtain turbulent flow. The value of the linear velocity is dependent on the design of the equipment used. The flows of solutions through the concentrate and diluate cells and the anode and cathode compartments should be substantially balanced in order to maintain a differential pressure across the membranes which is as low as possible to maintain membrane integrity. Solutions flows should be at flow rates such that the differential pressure does not exceed about 150 kPa and is preferably in the range of from 0 to about 50 kPa. Feed rates to the electrodialysis unit may be selected in the range of about 2 to 40 L/h.m$^2$ per membrane pair, the selected value being dependent on the impurity concentrations in the electrolyte and the value of the current density.

The current applied to the electrodes is controlled such that the membrane current density (applied current per membrane surface area) is such that water splitting is minimized. The current is equivalent to a current density in the range of about 10 to 500 A/m$^2$, the particular value selected being a function of the impurity concentrations in the electrolyte. Below about 10 A/m$^2$, the ionic transfer rate is too low (the rates approach those of diffusive transport). Above about 500 A/m$^2$ there are not enough monovalent ions to replenish the monovalent ions transferred from the diffusion layer at the membrane and, as a result, water splitting and/or loss of permselectivity would occur to an undesirable extent. The higher values of current density are required for efficient use of the equipment. Water splitting and permselectivity loss can be substantially obviated when operating with current densities in the preferred range of about 50 to 300 A/m$^2$ under conditions of turbulence in the concentrate and diluate cells. Current densities in this range also provide optimum efficiency and equipment size for the most economical operation.

The electrodialysis may be carried out in one or in more than one stage. Although electrodialysis may be effective in one stage to reduce concentrations of monovalent ions to the desired low concentrations, it may be desirable to have more than one stage of electrodialysis. In more than one stage, the stages are preferably connected in series, diluate withdrawn from one stage being fed to the diluate cells of a subsequent stage whereby concentrations of monovalent ions may be further reduced. If desired, the concentrate may be further concentrated by electrodialysis. Concentrate withdrawn from concentrate cells from the first stage electrodialysis is fed to the diluate cells of a second stage. Such a step may be advantageous to reduce loss of zinc with the concentrate, as concentrate is usually discarded as an effluent, after treatment. Diluate from such a second electrodialysis of concentrate may be returned as feed to the first stage electrodialysis.

If needed, the membranes may be cleaned periodically to remove any deposits such as of calcium sulfate or fluoride, or magnesium fluoride. The membranes may be cleaned with a suitable acid solution such as, for example, a 15% solution of acetic acid or a 2M hydrochloric acid followed by adequate rinsing with water. The electrodes may be cleaned with dilute sulfuric acid.

The invention will now be illustrated by means of the following non-limitative examples.

EXAMPLE 1

This example illustrates the removal of monovalent ions from zinc sulfate electrolyte by electrodialysis. The electrodialysis contained a number of alternating Selemion TM ASV anion permselective membranes and Selemion TM CSV cation permselective membranes with a total effective membrane area of 172 cm$^2$. The membranes were arranged conventionally such that an anion permselective membrane was next to the anode compartment, and a cation permselective membrane was next to the cathode compartment, both end cells (i.e. cells next to electrode compartments) being diluate cells.

An anode plate made of platinum-plated titanium and a cathode plate of stainless steel (SUS 304) were used in the anode and cathode compartment, respectively.

A zinc sulfate electrolyte solution containing 150 mg/L Cl$^-$, 50 mg/L F$^-$ and 12 mg/L Tl$^+$ was continuously fed to a recirculated diluate stream at 19.5 L/h.m$^2$ of effective membrane pair area, i.e. cell. The diluate stream was recirculated through the diluate cells at a linear velocity of 5 cm/s. Water, to which a small amount of electrolyte was added to improve electrical conductivity, was recirculated through the concentrate cells at a linear velocity of 5 cm/s. A 0.5M sodium sulfate solution, adjusted to pH 2 with sulfuric acid was fed at 116 L/h.m$^2$ per electrode pair, to the electrode compartments, to form the electrode rinse stream. The electrode rinse stream was recirculated through the electrode compartments at a rate sufficient to give a differential pressure of less than 10 kPa between it and the diluate and concentrate streams. The differential pressure between the diluate and concentrate streams was measured to be 3 kPa.

A direct current was passed between the electrodes at a current density of 174 A/m². Streams of the diluate, the concentrate and the electrode rinse solution were withdrawn.

A net water transfer of 1.5 L/h.m² per cell occurred from the diluate to the concentrate stream. The test was continued for 7 hours. The flowrates, pH and temperatures, and the results of Cl⁻, F⁻ and Tl⁺ transfer after the 7 hour period are given in Table I.

TABLE I

| Stream | Flowrate L/h · m² in | Flowrate L/h · m² out | pH | Impurity Concentration mg/L Cl⁻ | Impurity Concentration mg/L F⁻ | Impurity Concentration mg/L Tl | Temp °C. |
|---|---|---|---|---|---|---|---|
| Feed | 19.5 | — | 5.0 | 150 | 50 | 12 | 20 |
| Diluate | — | 18 | 3.3 | 74 | 43 | 8 | 38 |
| Concentrate | — | 1.5 | 2.8 | 916 | 98 | 46 | 38 |
| Electrode Rinse | 116 | 116 | 2.0 | 19 | 3 | 0.8 | 37 |
| Impurity Removal in % | | | | 56 | 18 | 37 | |

EXAMPLE 2

The test of Example 1 was repeated under the same conditions but with different flow rates of the feed to the diluate stream, the electrode rinse stream and the withdrawal of the diluate and concentrate streams. The flowrates and pH, and the results of Cl⁻, F⁻ and Tl transfer after 7 hours are given in Table II.

TABLE II

| Stream | Flowrate L/h · m² in | Flowrate L/h · m² out | pH | Impurity Concentration mg/L Cl⁻ | Impurity Concentration mg/L F⁻ | Impurity Concentration mg/L Tl |
|---|---|---|---|---|---|---|
| Feed | 9.7 | — | 5.0 | 150 | 50 | 12 |
| Diluate | — | 8.6 | 3.0 | 51 | 42 | 7 |
| Concentrate | — | 1.1 | 2.4 | 780 | 76 | 44 |
| Electrode Rinse | 70 | 70 | 1.8 | 29 | 4 | 0.6 |
| Impurity Removal in % | | | | 70 | 23 | 46 |

In comparison with Example 1, it can be seen that the impurity removal was improved by decreasing the flow rates.

EXAMPLE 3

In order to further improve fluoride removal, the experiment of Example 2 was repeated but with the electrode rinse maintained at a pH of 2.8. The increased pH of the rinse solution resulted in a correspondingly higher pH of the diluate and concentrate streams of 3.9 and 3.4, respectively. The fluoride removal improved to 31%. Thus, fluoride removal can be improved by increasing the pH of the diluate and concentrate recirculating streams of a value of at least about 3.5.

EXAMPLE 4

A number of tests was carried out in an effort to reduce the amounts of zinc and manganese that deposit on the electrodes. Using the equipment and conditions of previous examples, zinc and manganese concentrations in the electrode rinse solution were found to increase steadily with time.

The tests of this example were carried out with various compositions and flow rates of the sodium sulfate rinse solution. A soluble form of cobalt, i.e. cobalt sulfate, and of antimony, i.e. potassium antimony tartrate, were added in varying amounts to the rinse solution. Rinse solution was circulated through the electrode compartments at a rate sufficient to maintain the differential pressure across the membranes at about 10 kPa. A portion of the circulating solution was withdrawn and replaced with fresh solution. At the end of each test, i.e. after 72 h, the zinc and maganese contents of the removed solution were determined.

The current density, strength and pH of and additions to the rinse solution, the feed rate of fresh solution, and the zinc and manganese concentrations in removed rinse solution are given in Table III.

TABLE III

| Test No. | Current Density A/m² | Electrode Rinse Solution Na₂SO₄ M | pH | Co mg/L | Sb mg/L | Fresh Solution L/h/m² | Zn mg/L | Mn mg/L |
|---|---|---|---|---|---|---|---|---|
| 1 | 174 | 0.50 | 2 | — | — | 70 | 1800 | 20 |
| 2 | 174 | 0.25 | 2 | — | — | 210 | 700 | 8 |
| 3 | 116 | 0.20 | 3 | 110 | 100 | 70 | 1200 | 11 |
| 4 | 116 | 0.20 | 3.4 | 40 | 20 | 35 | 2300 | 20 |
| 5 | 116 | 0.10 | 2.5 | 10 | 5 | 145 | 690 | 7 |

In tests No. 2 and 3 the amount of zinc deposited on the cathode was 2050 mg and 560 mg, respectively, while little or no zinc deposited in tests 4 and 5. The amount of manganese was visually judged to decrease from the first to the last test.

It follows from these tests that the transfer of zinc and manganese to the electrode compartments can be reduced by using a high electrode rinse flow and/or the addition of a small amount of antimony and cobalt to the rinse solution. The combination of the use of a relatively large feed rate of fresh rinse solution and amounts of cobalt and antimony as small as 10 and 5 mg/L respectively, gave excellent results.

EXAMPLE 5

This example illustrates that electrode deposits can be significantly further reduced by arranging the membranes such that anion permselective membranes are adjacent the electrode compartment and by using a cathode of a material that promotes evolution of hydrogen over zinc deposition.

Using the electrodialysis unit used in previous examples, Selemion TM ASR anion and Seleminon TM CMR (surface treated) cation permselective membranes were alternately arrnaged such that anion perselective membranes were next to both cathode and anode compartments and the cells adjacent the electrode compartments were dilute cells. The anode was made of platinum-coated titanium. The cathode in tests 1 and 2 was made of stainless steel (SUS 304) and in test 3 of platinum-coated titanium. The rinse solution in tests 1 and 3 was 0.1 M Na₂SO₄ at pH 2.5 and in test 2 0.1M Na₂SO₄ with an added amount of 2 mg/L Co and 2 mg/L Sb at pH 2.5. Each test was continued for 72 hours. The current density, rinse solution flow rate, the range of zinc and manganes concentrations in the rinse solution of the 72 h period, and the weight of electrode deposits collected over the same period are given in Table IV.

TABLE IV

| Test No. | Current Density A/m² | Rinse Solution Rate L/h·m² | Zn mg/L | Mn mg/L | Electrode Deposits Zn mg | Electrode Deposits Mn mg |
|---|---|---|---|---|---|---|
| 1 | 116 | 145 | 15–56 | 0.7 | 560 | 0 |
| 2 | 100 | 150 | 34–45 | <1 | 370 | 0 |
| 3 | 100 | 150 | — | — | 230 | 0 |

It is noted that in other tests it had been determined that the Selemion TM ASR and CMR membranes yield results very much the same as the ASV and CSV membranes.

EXAMPLE 6

Test No. 3 of Example 5 was repeated using the same equipment and conditions, but after completion of the test, the electrode compartments were washed for 80 minutes with a circulating solution of 0.5M sulfuric acid. The resulting wash solution contained 210 mg zinc. The result shows that the electrode compartments can be effectively cleaned in situ.

EXAMPLE 7

This example illustrates that electrolyte with very high halide concentrations can be successfully treated. The electrodialysis unit as used in Example 5 was used. Test conditions and results are given in Tables V and VI.

TABLE V

| Test No. | Current Density A/m² | Feed Flowrate L/h·m² | Duration h | Halide Removal Cl⁻ % | Halide Removal F⁻ % | Water Transfer rate L/h·m² |
|---|---|---|---|---|---|---|
| 1 | 116 | 4.1 | 72 | 91 | 56 | 0.63 |
| 2 | 100 | 7.8 | 48 | 84 | 44 | 0.50 |
| 3 | 100 | 15.5 | 48 | 79 | 50 | 0.58 |

TABLE VI

| Test No. | Stream | Halide Concentrations in mg/L Cl⁻ | Halide Concentrations in mg/L F⁻ | Temperature °C. |
|---|---|---|---|---|
| 1 | Feed | 500 | 295 | 22 |
|   | Diluate | 48 | 130 | 36 |
|   | Concentrate | 2600 | 770* | 37 |
| 2 | Feed | 413 | 285 | — |
|   | Diluate | 71 | 175 | — |
|   | Concentrate | 3643 | 478* | — |
| 3 | Feed | 350 | 478* | 22 |
|   | Diluate | 75 | 172 | 36 |
|   | Concentrate | 5943 | 738* | 36 |

*Fine precipitate formed in withdrawn concentrate streams. The precipitate was found to consist mostly of sellaite (MgF₂). Precipitate accounts for the lower than expected fluoride concentration in the concentrates streams.

EXAMPLE 8

This example illustrates that losses of zinc from the electrolyte to the concentrate can be reduced by conducting electrodialysis at low current densities.

Using the electrodialysis unit described in Example 5, electrolyte was fed at 13.6 L/h.m² per membrane pair. The current density was 50 A/m². The results are given in Table VII.

TABLE VII

| Stream | Halide Concentration in mg/L Cl⁻ | Halide Concentration in mg/L F⁻ |
|---|---|---|
| Feed Electrolyte | 242 | 301 |
| Diluate | 87 | 236 |
| Concentrate | 8938 | 531* |
| *Sellaite precipitated Halide Removal | 65% | 22% |

Water transfer to concentrate was 0.2 L/h.m² per membrane pair. The feed stream contained 149 g/L Zn, the zinc transfer rate to the concentrate stream was 0.37 moles/h.m² per membrane pair.

Using the same electrolyte, a comparative test was made at 100 A/m². Although halide removal increased to 87% Cl⁻ and 56% F⁻, the water transfer also increased to 0.6 L/h.m², while the rate of zinc transfer increased to 1 mole/h.m² per membrane pair.

EXAMPLE 9

This example illustrates that zinc losses to a final concentrate, which is disposed of as an effluent after treatment, can be reduced by subjecting the concentrate to a retreatment.

A primary concentrate stream composite from various tests after standing (and sellaite precipitation) and having a pH of 3.4 was treated in the electrodialysis unit arranged as in Example 5.

Electrodialysis was conducted at 150 A/m² with an electrolyte feed rate of 12.8 L/h.m² per membrane pair. The results are given in Table VIII.

TABLE VIII

| Stream | Composition g/L Zn | Composition mg/L Cl⁻ | Composition mg/L F⁻ |
|---|---|---|---|
| Feed (Recycle conc.) | 145 | 3420 | 240 |
| Diluate | 140 | 800 | 180 |
| Concentrate | 89 | 18400 | 440* |
| *Sellaite precipitated Halide Removal |  | 78% | 30% |

Water transfer from dilute to concentrate stream was 0.92 L/h.m² per membrane pair.

EXAMPLE 10

This example illustrates that Neosepta TM membranes perform comparably to Selemion TM membranes. Using the unit as arranged in Example 5, Neosepta TM anionic permselective membranes and Neosepta TM CMS cationic permselective membranes were used. Electrolyte feed rate was 7.8 L/h.m² per membrane pair. The electrode rinse solution was 0.1M Na₂SO₄ maintained at pH 2.5 and added to and withdrawn from circulating rinse solution at a rate of 52 L/h.m². The test was conducted for 72 h at a current density of 60 A/m². Solution pH, stream composition and impurity removals are given in Table IX.

TABLE IX

| Stream | pH | g/L Zn | mg/L Cl⁻ | mg/L F⁻ | mg/L TL |
|---|---|---|---|---|---|
| Feed Electrolyte | 5.0 | 149 | 378 | 305 | 11 |
| Diluate | 3.9 | 147 | 88 | 214 | 7 |
| Concentrate | 2.8 | 124 | 6305 | 522* | 74 |
| Electrode Rinse | 2.5 | 0.01 | 15 | 2 | — |
| Impurity | — | — | 78% | 33% | 39% |

TABLE IX-continued

| Stream | pH | Stream Composition | | | |
|---|---|---|---|---|---|
| | | g/L Zn | mg/L Cl⁻ | mg/L F⁻ | mg/L Tl |
| Removal | | | | | |

*Sellaite precipitated

Water transfer from the diluate to the concentrate stream was 0.3 L/h.m² per membrane pair. As can be seen, the Neosepta ™ membranes gave results comparable to the Selemion ™ membranes.

EXAMPLE 11

This example illustrates the transfer of various elements in zinc sulfate electrolyte during electrodialysis. A typical electrolyte may contain Zn, Mg, Mn, Ca, Na, K, Cl, F, Tl, etc., and is basically a sulphate system. The distribution of elements during electrodialysis is illustrated by the following tests summarized in Table X, with stream compositions and pH values given in Table XI. Membranes used in all three tests were Neosepta ™ CMS & ACS.

TABLE X

| Test No. | Current Density A/m² | Feed Flow L/h·m² | Electrode Rinse L/h·m² | Exit conc. L/h·m² |
|---|---|---|---|---|
| 1 | 60 | 7.8 | 52 | 0.3 |
| 2 | 60 | 7.8 | 66 | 0.4 |
| 3 | 80 | 5.8 | 66 | 0.5 |

TABLE XI

| | g/L | | | | mg/L | | | | | pH |
|---|---|---|---|---|---|---|---|---|---|---|
| | Zn | Mg | Mn | Ca | Na | K | Tl | Cl⁻ | F⁻ | pH |
| Test No. 1 | | | | | | | | | | |
| Feed | 149 | 6.8 | 1.7 | 0.3 | 1000 | 110 | 11 | 378 | 305 | 5.0 |
| Diluate | 147 | 6.9 | 1.7 | 0.3 | 690 | 75 | 7 | 88 | 214 | 3.9 |
| Concentrate | 124 | 4.4 | 1.0 | 0.3 | 5800 | 615 | 74 | 6305 | 522* | 2.8 |
| Electrode Rinse | 0.01 | — | 0 | 0 | — | — | 0 | 15 | 2 | 2.5 |
| Test No. 2 | | | | | | | | | | |
| Feed | 147 | 7.0 | 1.7 | 0.3 | 800 | 82 | 9.0 | 68 | 252 | 5.1 |
| Diluate | 146 | 6.9 | 1.6 | 0.3 | 530 | 59 | 5.7 | 12 | 160 | 4.0 |
| Concentrate | 126 | 4.5 | 1.0 | 0.2 | 5400 | 530 | 75 | 1175 | 485* | 2.9 |
| Electrode Rinse | 0.008 | — | 0 | 0 | — | — | 0 | — | 1 | 2.5 |
| Test No. 3 | | | | | | | | | | |
| Feed | 108 | — | — | — | 4800 | 320 | 67 | 3730 | 504 | — |
| Diluate | 109 | — | — | — | 1900 | 240 | 22 | 280 | 182 | — |
| Concentrate | 42 | — | — | — | 12300 | 1100 | 91 | 13825 | 944* | — |
| Electrode Rinse | 0.007 | — | — | — | — | — | — | 100 | 4 | — |

*Sellaite precipitated

It follows from the results that monovalent ions ($Na^+$, $K^+$, $Tl^+$, $Cl^-$ and $Fl^-$) in the feed solutions were preferentially transported into the concentrate stream, and hence effecting their removal from the feed electrolyte, resulting in purified electrolyte.

EXAMPLE 12

This example illustrates that deposits formed during electrodialysis can be periodically removed by washing the unit with suitable acidic solution. In one test, carried out at 100 A/m², the unit voltage gradually increased over a 48 h period from 12 V to 21 V. The process was interrupted and a 15% acetic acid solution was circulated through the concentrate cells for a period of 80 minutes. To minimize stress on the membranes, water was recirculated through the diluate cells. The concentrate cells were subsequently rinsed with water. Upon resumption of the electrodialysis, the unit voltage was 11 V.

In a second test the unit voltage increased gradually from 12 V to 16 V after 72 h of operation. The anionic membranes were removed from the unit and soaked in 2M HCl for 17 h and subsequently rinsed with water. Upon starting the reassembled unit, the voltage was measured at 11.5 V.

It follows from these tests that membranes can be cleaned by contacting with acetic or hydrochloric acid, with or without removing membranes from the electrodialysis unit. Adequate rinsing with water is necessary, especially if hydrochloric acid is used, in order to avoid electrolyte contamination by the cleaning solution.

We claim:

1. A method for the purification of zinc sulfate electrolyte containing concentrations of monovalent cations including at least one cation chosen from the group consisting of thallium, sodium and potassium and monovalent anions including at least one anion chosen from the group consisting of chloride and fluoride by electrodialysis, which method comprises the steps of feeding zinc sulfate electrolyte to diluate cells of an electrodialysis unit comprising a multiplicity of alternating monovalent cation permselective exchange membranes and monovalent anion permselective exchange membranes, said membranes defining alternating diluate and concentrate cells, an anode compartment and a cathode compartment, an anode positioned in the anode compartment and a cathode positioned in the cathode compartment; rinsing said anode compartment and said cathode compartment with circulating rinse solutions; applying an electrical current between the anode and the cathode at a value such that the value of the corresponding current density is in the range of about 10 to 500 A/m²; maintaining the temperature in the unit in the range of about 0° to 60° C.; feeding electrolyte at a pH having a value of less than about 5.5; passing flows of solutions through the diluate and concentrate cells at a linear velocity sufficient to maintain turbulent flow in said cells; withdrawing a diluate from said diluate cells; and recovering purified zinc sulfate electrolyte with reduced concentrations of monovalent cations and monovalent anions.

2. A method as claimed in claim 1, wherein said membranes have a membrane matrix of a styrene di-vinyl benzene copolymer and have active groups in an amount in the range of about 3 to 4 milli-equivalents per gram of dry resin, the active groups of the monovalent cation permselective exchange membranes are sulfonic acid radicals and the active groups of the monovalent anion permselective exchange membranes are quaternary ammonium groups.

3. A method as claimed in claim 2, wherein said quaternary ammonium groups are derived from trimethylamine.

4. A method as claimed in claim 1, wherein said monovalent cation permselective exchange membranes in the electrodialysis unit are replaced with cation exchange membranes which have a membrane matrix of a styrene divinyl benzene copolymer and active groups of sulfonic acid radicals in an amount in the range of about 3 to 5 milli-equivalents per gram of dry resin, and purified zinc sulfate electrolyte with reduced concentrations of monovalent anions is recovered.

5. A method as claimed in claim 1, wherein the current density is in the range of about 50 to 300 A/m$^2$.

6. A method as claimed in claim 1, wherein the pH of solutions passing through the diluate and concentrate cells is in the range of about 2 to 5.5.

7. A method as claimed in claim 1, wherein the pH of solutions passing through the diluate and concentrate cells is in the range of about 3.5 to 5.5

8. A method as claimed in claim 1, wherein the temperature in the electrodialysis is maintained in the range of about 20° to 50° C.

9. A method as claimed in claim 1, wherein said flows of solutions passing through the diluate and concentrate cells are substantially balanced at flow rates such that the differential pressure across the membranes does not exceed about 150 kPa.

10. A method as claimed in claim 1, wherein at least a portion of the diluate removed from the diluate cells is recycled to the diluate cells.

11. A method as claimed in claim 1, wherein at least a portion of the concentrate withdrawn from concentrate cells is recycled to the concentrate cells.

12. A method as claimed in claim 1, wherein a quantity of a receiving solution is fed to the concentrate cells when the net water transfer rate to the concentrate cell in the electrodialysis is less than the withdrawal rate of concentrate from the concentrate cells, said receiving solution being chosen from water, dilute sulfuric acid and dilute sodium sulfate solution.

13. A method as claimed in claim 1, wherein said membranes are arranged in the electrodialysis unit such that monovalent anionic permselective exchange membranes form the end membranes next to the electrode compartments.

14. A method as claimed in claim 1, wherein to said rinse solution is added a small amount of a soluble form of at least one element chosen from the group consisting of antimony and cobalt in amounts of up to about 100 mg antimony and up to about 100 mg cobalt per liter of rinse solution.

15. A method as claimed in claim 1, wherein to said rinse solution is added an amount of a soluble form of antimony in the range of about 2 to 10 mg Sb/L and an amount of a soluble form of cobalt in the range of about 2 to 5 mg Co/L of rinse solution.

16. A method as claimed in claim 1, wherein the cathode is made of a suitable material that promotes the evolution of hydrogen over zinc deposition.

17. A method as claimed in claim 1, wherein the cathode is made of platinum-coated titanium.

18. A method as claimed in claim 1, wherein said circulating rinse solutions are chosen from the group consisting of water, dilute sulfuric acid and sodium sulfate solution and are maintained at a pH at a value in the range of about 0 to 4.

19. A method as claimed in claim 1, wherein said circulating rinse solutions are a common solution of sodium sulfate containing sodium sulfate in a concentration in the range of about 0.1 to 1.0 molar, and said common solution of sodium sulfate is maintained at a value of the pH in the range of about 2 to 3 and is circulated at a rate sufficient to give a differential pressure across the membranes of less than about 150 kPa.

20. A method as claimed in claim 1, wherein said circulating rinse solutions are a common solution, and a portion of the rinse solution is removed from circulation and is replaced with a substantially equal portion of fresh solution so that the concentration of zinc in said common rinse solution is maintained at less than about 150 mg/L.

21. A method as claimed in claim 1, wherein feed rates of electrolyte to said diluate cells of the electrodialysis unit are in the range of about 2 to 40 L/h.m$^2$ per membrane pair.

22. A method as claimed in claim 1, wherein said electrodialysis is carried out in more than one stage by feeding diluate withdrawn from said diluate cells in one stage to diluate cells of a subsequent stage whereby concentrations of monovalent ions are further reduced.

23. A method as claimed in claim 1, wherein said electrodialysis is carried out in two stages by feeding concentrate withdrawn from said concentrate cells in one stage to diluate cells of a second stage whereby loss of zinc in concentrate is reduced.

24. A method as claimed in claim 1, wherein said membranes are cleaned periodically with a solution chosen from the group consisting of a 15% solution of acetic acid and 2M hydrochloric acid followed by adequate rinsing of said membranes with water.

25. A method for the purification of zinc sulfate electrolyte containing concentrations of monovalent cations including at least one cation chosen from the group consisting of thallium, sodium and potassium and monovalent anions including at least one anion chosen from the group consisting of chloride and fluoride by electrodialysis, which method comprises the steps of feeding zinc sulfate electrolyte at rates in the range of about 2 to 40 L/h.m$^2$ per membrane pair to diluate cells of an electrodialysis unit comprising a multiplicity of alternating monovalent cation permselective exchange membranes and monovalent anion permselective exchange membranes, said membranes having a membrane matrix of a styrene di-vinyl benzene copolymer and having active groups in an amount in the range of about 3 to 4 milli-equivalents per gram of dry resin, the active groups of the monovalent cation permselective exchange membranes being sulfonic acid radicals and the active groups of the monovalent anion permselective membranes being a derivative of trimethylamine, said membranes defining alternating diluate and concentrate cells, an anode compartment and a cathode compartment, said membranes being arranged in the electrodialysis unit such that monovalent anionic permselective exchange membranes form the end membranes next to the electrode compartments, an anode positioned in the anode compartment and a cathode made of platinum coated titanium positioned in the cathode compartment; rinsing said anode compartment and said cathode compartment with a circulating rinse solution having a pH in the range of about 2 to 3 and containing sodium sulfate in a concentration in the range of about 0.1 to 1.0M, a soluble form of antimony in an amount in the range of about 2 to 10 mg Sb/L of rinse solution and a soluble form of cobalt in an amount in the range of about 2 to 5 mg Co/L of rinse solution; maintaining a concentration of zinc in said rinse solution of less than about 150 mg/L; applying an electrical current between the anode and the cathode at a value such that the value of the corresponding current density is in the range of about 50 to 300 A/m$^2$; maintaining the temperature in the unit in the range of about 20° to 50° C.; feeding electrolyte at a pH having a value in the range of about 2 to 5.5; passing flows of solutions through the diluate and concentrate cells at a linear velocity sufficient to maintain turbulent flow in said cells; passing said flows of solutions through the diluate and concentrate cells and said rinse solution circulating through said anode compartment and said cathode compartment at flow rates such that the differential pressure across the membranes is less than about 50 kPa; withdrawing a diluate from said diluate cells; and recovering purified zinc sulfate electrolyte with reduced concentrations of monovalent cations and monovalent anions.

* * * * *